(12) United States Patent
Miya

(10) Patent No.: US 9,184,639 B2
(45) Date of Patent: Nov. 10, 2015

(54) MOTOR SUPPORT STRUCTURE OF LENS BARREL

(71) Applicant: HOYA CORPORATION, Tokyo (JP)

(72) Inventor: Kota Miya, Saitama (JP)

(73) Assignee: HOYA CORPORATION, Tokyo (JP)

( * ) Notice: Subject to any disclaimer, the term of this patent is extended or adjusted under 35 U.S.C. 154(b) by 397 days.

(21) Appl. No.: 13/681,775

(22) Filed: Nov. 20, 2012

(65) Prior Publication Data

US 2013/0134814 A1 May 30, 2013

(30) Foreign Application Priority Data

Nov. 24, 2011 (JP) .................................. 2011-255751

(51) Int. Cl.
*H02K 5/04* (2006.01)
*H02K 5/26* (2006.01)
*G02B 7/08* (2006.01)

(52) U.S. Cl.
CPC .. *H02K 5/04* (2013.01); *G02B 7/08* (2013.01); *H02K 5/26* (2013.01)

(58) Field of Classification Search
None
See application file for complete search history.

(56) References Cited

U.S. PATENT DOCUMENTS

| 5,231,473 | A * | 7/1993 | Kawamura et al. ........... 359/694 |
| 7,068,929 | B2 * | 6/2006 | Nomura ............................ 396/73 |
| 2006/0078322 | A1 * | 4/2006 | Nomura ............................ 396/73 |
| 2006/0115262 | A1 * | 6/2006 | Nomura ........................ 396/349 |

FOREIGN PATENT DOCUMENTS

| JP | 9-187507 U | 12/1984 |
| JP | S59-187507 U | 12/1984 |
| JP | 2008-040140 | 2/2008 |
| JP | 2008-058592 A | 3/2008 |
| JP | 2008-225097 A | 9/2008 |

OTHER PUBLICATIONS

Japanese Office Action mailed Jun. 2, 2015 in Japanese Patent Application No. 2011-255751, along with an English translation thereof.

* cited by examiner

*Primary Examiner* — Tran Nguyen
(74) *Attorney, Agent, or Firm* — Greenblum & Bernstein, P.L.C.

(57) ABSTRACT

A motor support structure of a lens barrel in which a support member of the lens barrel supports a motor having a rotary shaft, includes a radial position limiter which limits a radial position of the motor with respect to the support member in radial directions orthogonal to the rotary shaft; an axial-position limiter which limits an axial position of the motor with respect to the support member in an axial direction of the rotary shaft when the motor is turned to a predetermined position about the rotary shaft with the radial position of the motor limited by the radial position limiter; and a rotation limiter which limits the turning of the motor about the rotary shaft at the predetermined position, at which the axial position of the motor is limited by the axial-position limiter.

7 Claims, 12 Drawing Sheets

MOTOR SUPPORT STRUCTURE OF LENS BARREL

1. FIELD OF THE INVENTION

The present invention relates to a motor support structure provided on a lens barrel.

2. DESCRIPTION OF THE RELATED ART

As a structure for fixing a motor for driving an optical element(s) to a support member provided in a lens barrel, a fixing structure using a set screw(s) and another fixing structure using an adhesive are known in the art. In the fixing structure using a set screw(s), there are the following problems: the fixing portion(s) may be distorted by a screw-tightening force to thereby deteriorate the accuracy of the motor support structure, the screw-tightening operation may not be easily performed due to a limited working space, and the space for the set screw(s) may become an obstacle in miniaturization of the fixing structure. In the fixing structure using an adhesive, it is required to strictly control the film thickness of the adhesive at the time of application thereof so that the drive motor is precisely fixed to the support member at a predetermined position, which is troublesome.

To overcome such problems, a structure in which the motor and the support member are brought into engagement with each other via a linkage different from screws or an adhesive has been proposed in Japanese Unexamined Patent Publication No. 2008-40140. Specifically, a plurality of projections and a corresponding plurality of depressions are formed as the linkage on the motor and the support member, respectively, and the support member and the motor are brought close together in the axial direction of the rotary shaft of the motor with the projections and the depressions aligned in the axial direction of the rotary shaft. Upon the support member and the motor being brought close to each other beyond a predetermined degree, the projections are respectively engaged in the depressions, so that the motor is supported by the support member.

SUMMARY OF THE INVENTION

According to the structure disclosed in the above-mentioned Japanese Unexamined Patent Publication No. 2008-40140, strict alignment is required between the projections and the depressions when the motor is mounted to the support member, so that there is room for improvement in mountability of the motor. The present invention provides a motor support structure of a lens barrel which makes it possible to mount the motor to the support member more easily and reliably.

According to an aspect of the present invention, a motor support structure of a lens barrel in which a support member of the lens barrel supports a motor having a rotary shaft, is provided, the motor support structure including a radial position limiter which limits a radial position of the motor with respect to the support member in radial directions orthogonal to the rotary shaft; an axial-position limiter which limits an axial position of the motor with respect to the support member in an axial direction of the rotary shaft when the motor is turned to a predetermined position about the rotary shaft with the radial position of the motor limited by the radial position limiter; and a rotation limiter which limits the turning of the motor about the rotary shaft at the predetermined position, at which the axial position of the motor is limited by the axial-position limiter.

It is desirable for the support member to include a motor support surface which is orthogonal to the rotary shaft of the motor, and for the radial position limiter to include a support seat which is provided on the motor and supported by the motor support surface thereon; and a plurality of peripheral border contact portions which are formed on the motor support surface and surround the support seat to limit movement of the support seat in the radial directions when the support seat of the motor is mounted onto the motor support surface to be supported thereby.

It is desirable for the support seat of the motor to include a rotational guide support portion, at least part of an outer edge of the rotational guide support portion having a circular shape about the rotary shaft. At least one of the plurality of peripheral border contact portions is formed as a part of a cylindrical surface that is centered about the rotary shaft and comes in contact with the rotational guide support portion.

With this structure, the motor can be guided in a turning direction about the rotary shaft of the motor with respect to the support member.

It is desirable for the axial-position limiter to include a radial projecting portion which projects radially from the rotational guide support portion of the motor, and an axially opposed portion which is formed on the support member and is positioned to be opposed to the radial projecting portion in the axial direction of the rotary shaft when the motor is turned to the predetermined position about the rotary shaft.

It is desirable for a plurality of the radial projecting portions to be arranged at different circumferential positions about the rotary shaft, and for a plurality of the axially opposed portions to be arranged at different circumferential positions about the rotary shaft.

It is desirable for the rotation limiter to include a projection and a depression which are provided on one and the other of the radial projecting portion and the axially opposed portion, respectively, to be engaged with each other in an axially aligned state when the motor is turned to the predetermined position about the rotary shaft.

It is desirable for the motor to include a motor body from which the rotary shaft projects, and a motor support seat, to which the motor body is fixed and which is fixed to the support member.

According to the present invention, by turning the motor about the rotary shaft thereof relative to the support member with the radial position of the motor being fixed by the radial position limiter, the radial movement of the motor is prevented by the axial-position limiter and the rotation limiter to complete the mounting of the motor. Accordingly, in the motor mounting operation, it does not take much time and labor to align and install the motor compared with conventional motor support structures, and it is possible to easily and securely support the motor onto the lens barrel.

The present disclosure relates to subject matter contained in Japanese Patent Application No. 2011-255751 (filed on Nov. 24, 2011) which is expressly incorporated herein by reference in its entirety.

BRIEF DESCRIPTION OF THE DRAWINGS

The present invention will be described below in detail with reference to the accompanying drawings in which.

DESCRIPTION OF THE EMBODIMENT

Figure 1:
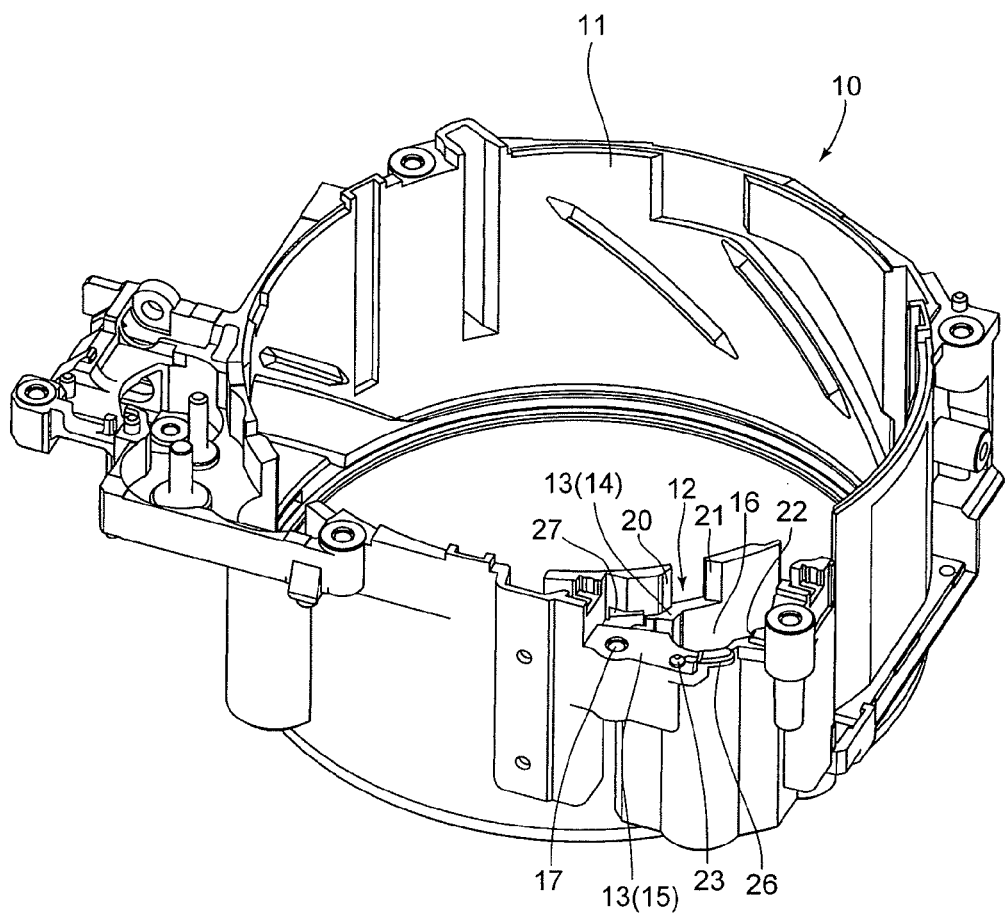
FIG. 1 is a perspective view of a support member of a lens barrel according to the present invention.
Figure 2:
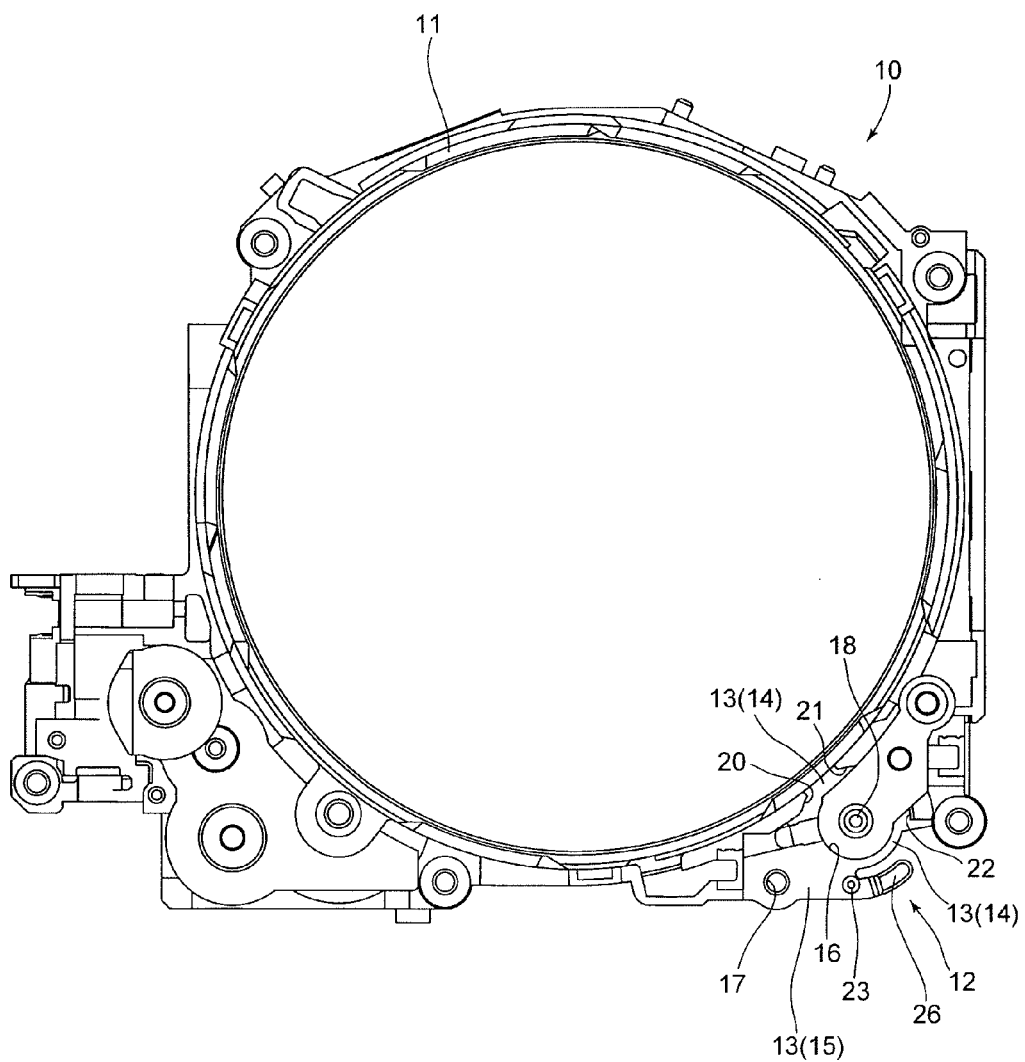
FIG. 2 is a front elevational view of the support member shown in FIG. 1, viewed from the object side.

A support member 10 shown in FIGS. 1 and 2 is a housing of a lens barrel and fixed to the inside of a camera body (not shown in the drawings). The support member 10 is provided with a ring-shaped portion 11 which holds an imaging optical system (not shown) and a support mechanism (not shown) for this imaging optical system. The support member 10 is further provided on the outside of the ring-shaped portion 11 with a motor support portion 12. A motor unit 30 (see FIGS. 5 and 6) for driving a movable lens group(s) of the aforementioned imaging optical system in an optical axis direction is mounted onto the motor support portion 12 to be supported thereby. In the following descriptions, the object side and the image surface side of the imaging optical system that is held by the ring-shaped portion 11 therein are referred to as the front side and the rear side, respectively. FIGS. 1 through 12, except FIG. 9, each show a state of the support member 10 and/or the motor unit 30 as viewed from the front (or obliquely from front in the case of a perspective view), and only FIG. 9 shows a state of the support member 10 and the motor unit 30 as viewed from the rear.

Figure 5:
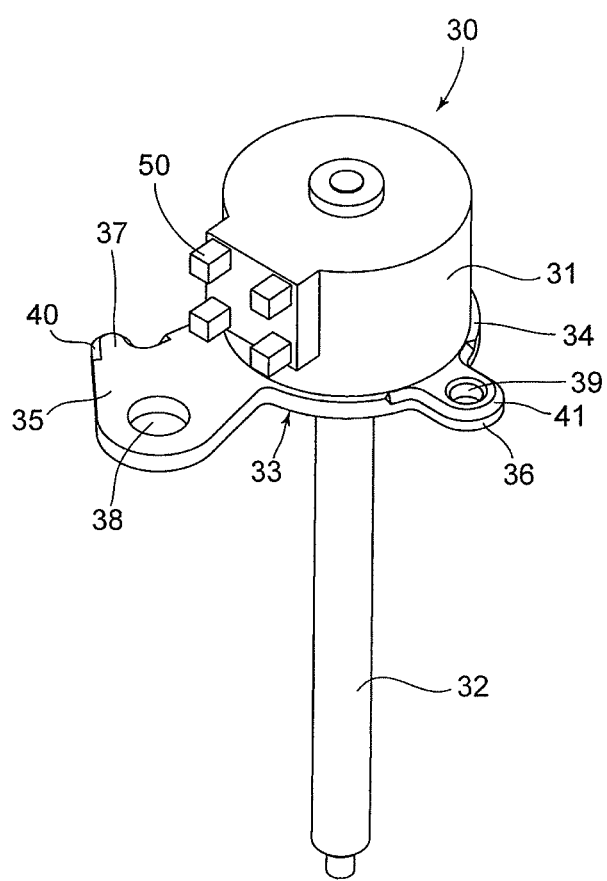
FIG. 5 is perspective view of a motor unit which is fixed to the support member.
Figure 6:
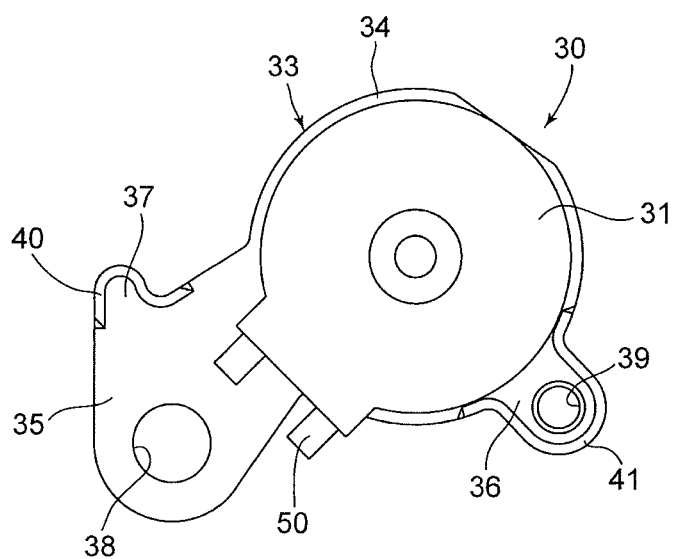
FIG. 6 is a front view of the motor unit, viewed from the object side.

As shown in FIGS. 5 and 6, the motor unit 30 is provided with a cylindrical motor body 31 and a drive shaft (rotary shaft) 32 which projects from an end surface of the motor body 31. The motor body 31 is provided on a side thereof with a connector 50 for receiving power supply to the motor unit 30 and inputting drive signals for the motor unit 30. In a state where the motor unit 30 is mounted to the support member 10 via a support structure (motor support structure) which will be discussed later, the axis of the drive shaft 32 is substantially parallel to the optical axis direction of the imaging optical system, and a feed screw formed on the periphery of the drive shaft 32 is screw-engaged with a nut (not shown) which is a component of a lens drive mechanism. A movable-lens-group holding frame (not shown) is supported by the ring-shaped portion 11 of the support member 10 therein to be movable in the optical axis direction, and the aforementioned nut is positioned in front of or behind a contact portion formed on the aforementioned movable-lens-group holding frame to face this contact portion. This movable-lens-group holding frame is biased in a direction to come in contact with the aforementioned nut. Rotating the drive shaft 32 forward and reverse causes the nut to move along the axis of the drive shaft 32 forward and rearward, thus causing the movable-lens-group holding frame to move in the optical axis direction in accordance with the forward and rearward movement of the nut. This type of lens drive mechanism is known in the art, so that the detailed description thereof will be omitted from the following description. Although a focusing lens group is assumed to be used as the aforementioned movable lens group that is driven by a lens drive mechanism with the motor unit 30 as a drive source in the present embodiment, the motor that is supported by the motor support structure according to the present invention can be a motor which drives an element other than a focusing lens group.

The motor unit 30 is provided with a motor support seat 33. The motor support seat 33 is a flat plate portion of the motor unit 30 and extends, and lies, in a plane orthogonal to the axis of the drive shaft 32 of the motor support seat 33. The motor support seat 33 is provided with a central support portion (radial position limiter/rotational guide support portion) 34, a first radial projecting portion (axial-position limiter) 35 and a second radial projecting portion (axial-position limiter) 36. The central support portion 34 is positioned between the motor body 31 and the drive shaft 32. The first radial projecting portion 35 and the second radial projecting portion 36 project radially outwards in different radial directions from the central support portion 34. The central support portion 34 is formed to be in contact with an end surface (bottom end surface with respect to FIG. 5) of the motor body 31, and the outer edge of the central support portion 34 is circular in shape, having a diameter slightly greater than the diameter of the motor body 31. The first radial projecting portion 35 and the second radial projecting portion 36 project from the central support portion 34 in radially outward directions substantially orthogonal to each other, and the first radial projecting portion 35 is provided on a side thereof with a hook (axial-position limiter) 37 which projects in an approximate circumferential direction of the motor support seat 33. A screw insertion hole 38 is formed through the first radial projecting portion 35, and a lock depression (rotation limiter) 39 is formed in the second radial projecting portion 36. The lock depression 39 is a through-hole formed through the second radial projecting portion 36, but can be formed as a bottomed hole the rear end of which (shown in FIG. 9) is closed. In addition, a chamfer 40 having a beveled cross-sectional shape that reduces the thickness of the hook 37 toward the outer edge thereof is formed at the peripheral edge of the front surface of the hook 37, while a chamfer 41 having a beveled cross-sectional shape that reduces the thickness of the second radial projecting portion 36 toward the outer edge thereof is formed at the peripheral edge of the front surface of the second radial projecting portion 36.

Figure 3:
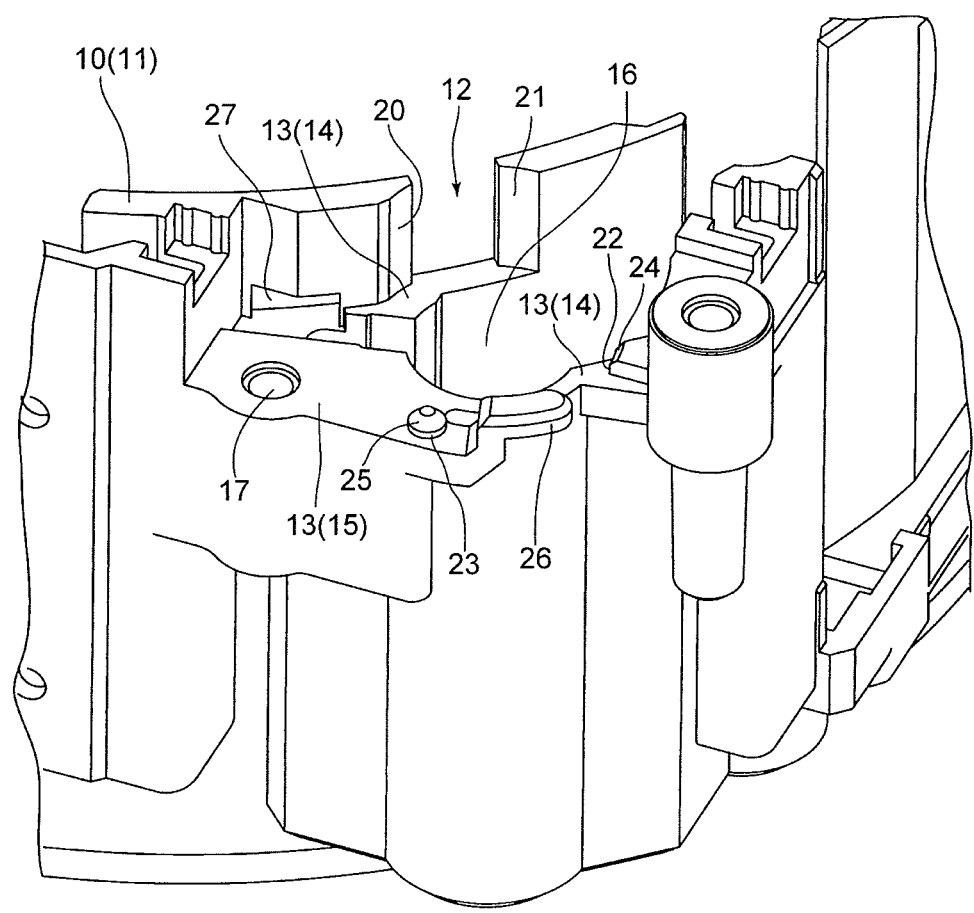
FIG. 3 is an enlarged perspective view of a portion of the support member show in FIG. 1.
Figure 4:
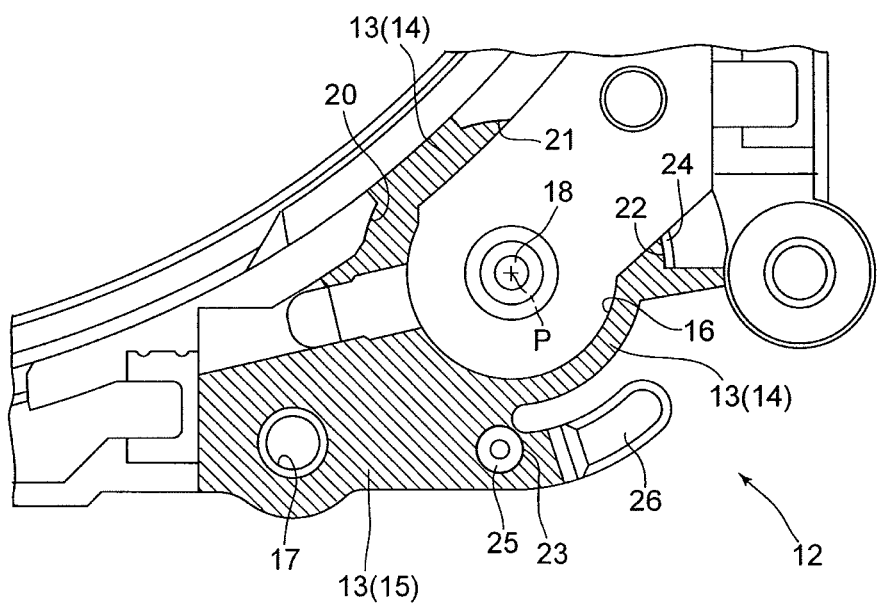
FIG. 4 is an enlarged front view of a portion of the support member shown in FIG. 2.
Figure 11:
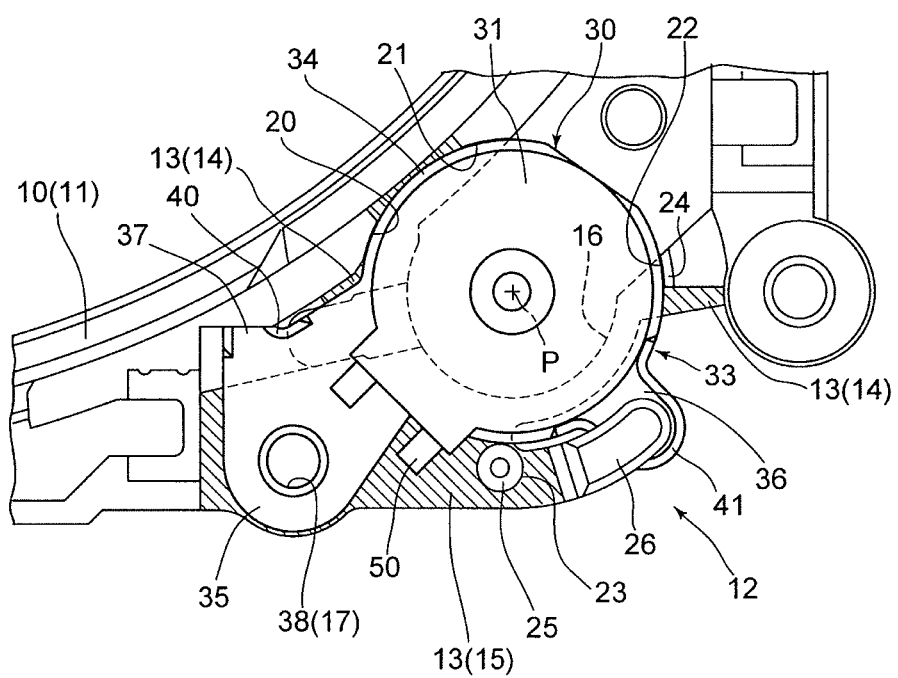
FIG. 11 is a rear view of the portion of the support member and the motor unit in the state shown in FIG. 10.

FIGS. 3 and 4 show the motor support portion 12 of the support member 10 in an enlarged manner. The motor support portion 12 is formed as a recessed portion which is open toward the front. The motor support portion 12 is provided thereon with a support surface (motor mounting surface) 13 with which the motor support seat 33 comes in contact. The letter "P" shown in FIGS. 4, 8 and 11 show the axis of rotation (rotational center) of the drive shaft 32 when the motor unit 30 is mounted onto the motor support seat 33. The support surface 13 is a flat surface orthogonal to the rotation axis P. In FIGS. 4, 8 and 11, the support surface 13 is hatched so as to be visually identified easily. The support surface 13 has a discontinuous ring-shaped support surface 14 that supports the central support portion 34 and an extended support surface 15 which supports the first radial projecting portion 35. A drive shaft insertion hole 16 which extends rearward is formed in the ring-shaped support surface 14 at the center thereof and a screw hole 17 is formed in the extended support surface 15. The motor support portion 12 is provided at the base of the drive shaft insertion hole 16 with a shaft support portion 18 (see FIG. 4) which supports the end of the drive shaft 32.

The motor support portion 12 is provided, on the support surface 13 around the ring-shaped support surface 14, with three radial position limiting surfaces (radial position limiters/peripheral border contact portions) 20, 21 and 22, and a radial position limiting projection (radial position limiter/peripheral border contact portion) 23. Each of the radial position limiting surfaces 20, 21 and 22 is a part of a common cylindrical surface (the inner periphery of a cylinder) about the rotation axis P. Each of the radial position limiting surfaces 20 and 21 is formed in such a manner as to cut off part of the outer periphery of the ring-shaped portion 11 and is longer in the optical axis direction (vertical direction with respect to FIG. 3) than the radial position limiting surface 22. In addition, the motor support portion 12 is provided, adjacent to the radial position limiting surface 22, with a bevel 24 which is inclined away from the rotation axis P in the forward direction. The radial position limiting projection 23 projects forward from the support surface 13 and has a cylindrical outer surface about an axis parallel to the rotation axis P. The radial position limiting projection 23 is provided on a front part of the cylindrical outer periphery thereof with a truncated conical surface 25, the diameter of which reduces toward the forward direction.

When the motor support seat 33 is mounted onto the support surface 13, the radial position limiting surfaces 20, 21 and 22 and the radial position limiting projection 23 allow the motor unit 30 to be turned about the rotation axis P while holding the outer edge of the central support portion 34 (see FIGS. 8 and 11). As shown in FIG. 4, the radial position limiting surfaces 20 and 22 are arranged on substantially opposite sides of the rotation axis P while the radial position limiting surface 21 and the radial position limiting projection 23 are arranged on substantially opposite sides of the rotation axis P. Accordingly, in a state where the radial position limiting surfaces 20, 21 and 22 and the radial position limiting projection 23 are in contact with the outer edge of the central support portion 34, the motor unit 30 is prevented from moving radially.

The motor support portion 12 is further provided with a movement limiting arm (axial-position limiter/axially opposed portion) 26 and a movement limiting hole (axial-position limiter/axially opposed portion) 27. The movement limiting arm 26 is a cantilever which is elongated in a circumferential direction about the rotation axis P from a portion of the motor support portion 12 near the radial position limiting projection 23. The movement limiting arm 26 is stepped forward with respect to the support surface 13. The movement limiting arm 26 is provided on a rear surface thereof with a lock projection (rotation limiter) 28 (see FIG. 9). The lock projection 28 is positioned in a path of the lock depression 39 when the motor unit 30 is turned about the rotation axis P to be engageable in the lock depression 39. In a state where the lock projection 28 is engaged in the lock depression 39, the motor unit 30 is prevented from being turned about the rotation axis P with respect to the motor support portion 12. The movement limiting hole 27 is a hole formed on the outer periphery of the ring-shaped portion 11 and allows the hook 37 of the first radial projecting portion 35 to be engaged in the movement limiting hole 27 when the motor unit 30 is turned about the rotation axis P.

Operations to mount the motor unit 30 to the motor support portion 12 that has the above described structure will be discussed hereinafter. First, with the projecting direction of the drive shaft 32 from the motor body 31 directed rearward, the motor support seat 33 is bought close to the support surface 13 while the drive shaft 32 is inserted into the drive shaft insertion hole 16. At this stage, the position of the motor unit 30 in the rotational direction thereof with respect to the motor support portion 12 is such that the second radial projecting portion 36 passes between the radial position limiting surface 22 and the movement limiting arm 26 as shown in FIG. 8. However, this position of the motor unit 30 does not have to be very precise, so long as this position does not interfere with the mounting of the first radial projecting portion 35 and the second radial projecting portion 36; namely, at this stage, a precise positioning of the motor unit 30 in the rotational direction thereof with respect to the motor support portion 12 is not required. Additionally, even if the motor unit 30 deviates or tilts with respect to the rotation axis P by a certain amount during the process of inserting the motor unit 30 into the motor support portion 12 to be mounted thereto, the bevel 24 and the truncated conical surface 25 function as guide surfaces for leading the central support portion 34 to a proper contact position to come in contact properly with the radial position limiting surface 22 and the radial position limiting projection 23, so that the insertion operation for the motor unit 30 into the motor support portion 12 can be easily performed.

Figure 7:
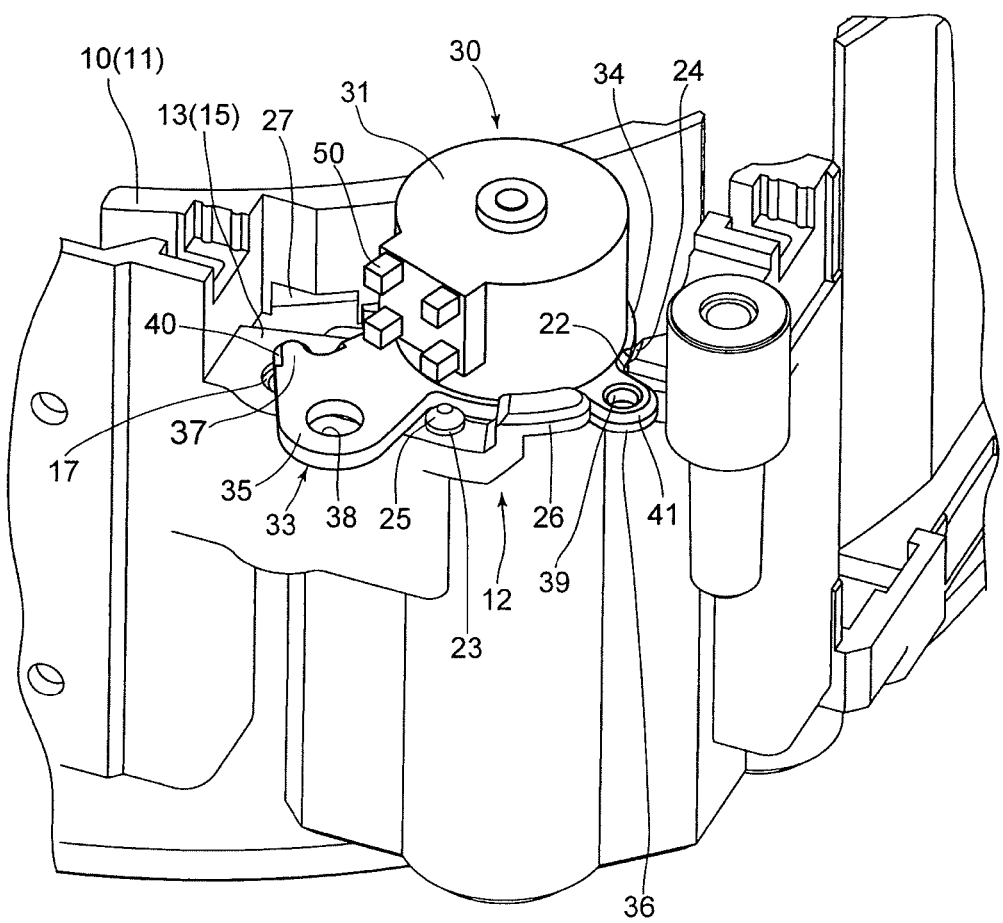
FIG. 7 is a perspective view of the portion of the support member shown in FIG. 3 and the motor unit shown in FIGS. 5 and 6, illustrating a process of mounting the motor unit to a motor support portion of the support member.
Figure 8:
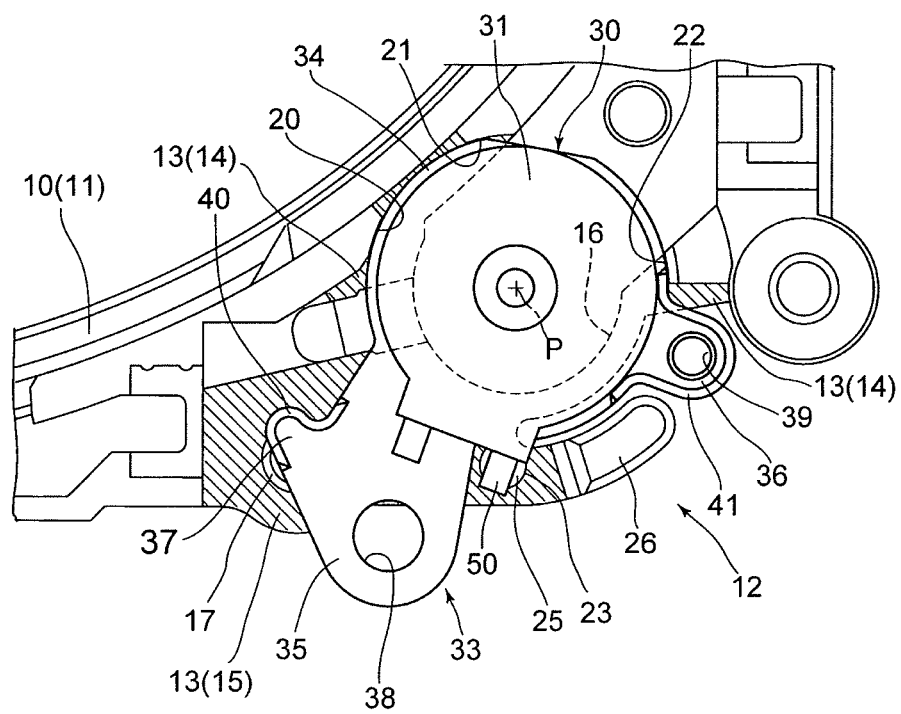
FIG. 8 is a front view of the portion of the support member and the motor unit in the state shown in FIG. 7, viewed from the object side.
Figure 9:
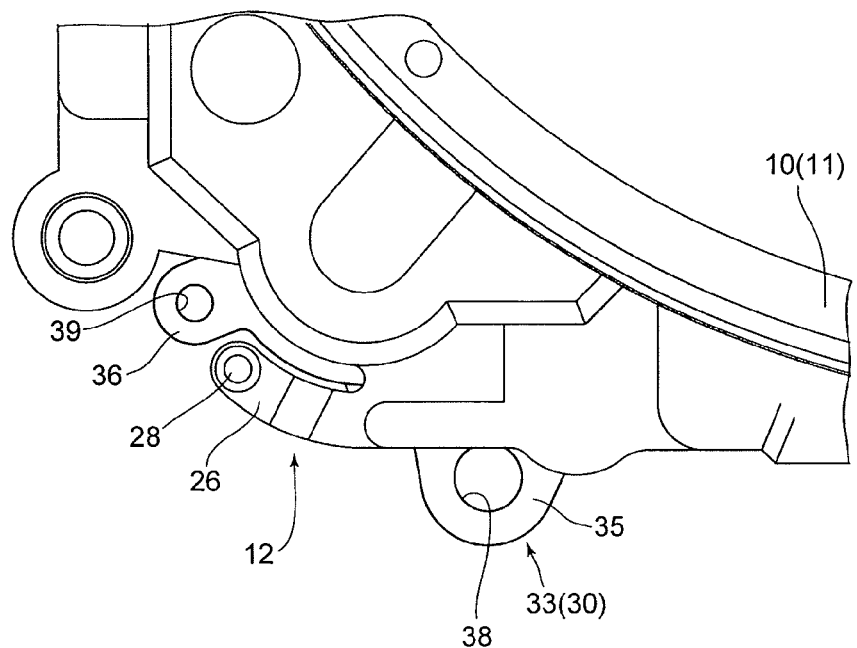
FIG. 9 is a rear view of the portion of the support member and the motor unit in the state shown in FIG. 7.

Upon the motor support seat 33 coming in contact with the support surface 13, the motor unit 30 is in the position shown in FIGS. 7 and 8, in which the motor unit 30 is prevented from being further inserted into the motor support portion 12. In this state, the end of the drive shaft 32 is engaged with the shaft support portion 18. Furthermore, the outer edge of the central support portion 34 is in contact engagement with the radial position limiting surfaces 20, 21 and 22 and the radial position limiting projection 23, which prevents the motor unit 30 from moving in radial directions about the rotation axis P. On the other hand, the motor unit 30 can be turned about the rotation axis P with respect to the motor support portion 12 since the radial position limiting surfaces 20, 21 and 22 are each formed as a part of a common cylindrical surface about the rotation axis P and since the radial position limiting projection 23 contacts the central support portion 34 in a linear area thereon along the rotation axis P.

Figure 10:
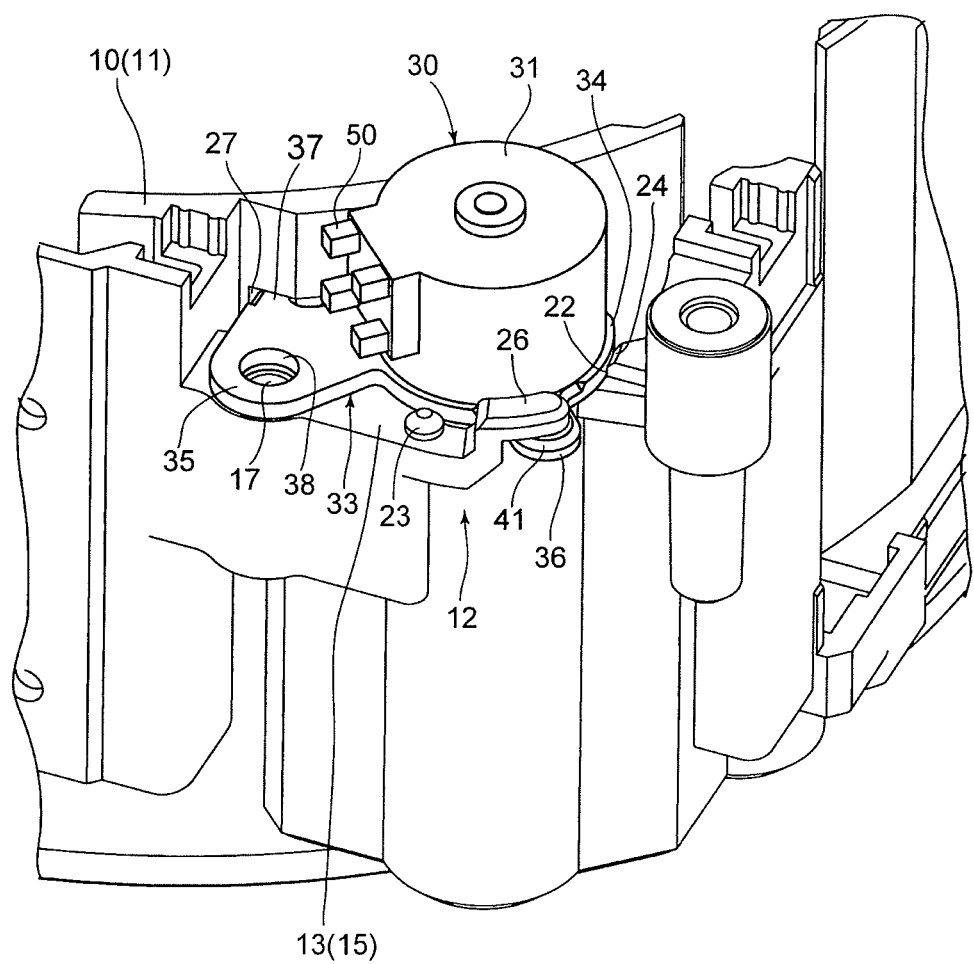
FIG. 10 is a view similar to that of FIG. 7, illustrating a state where the motor unit is mounted to the motor support portion of the support member.
Figure 12:
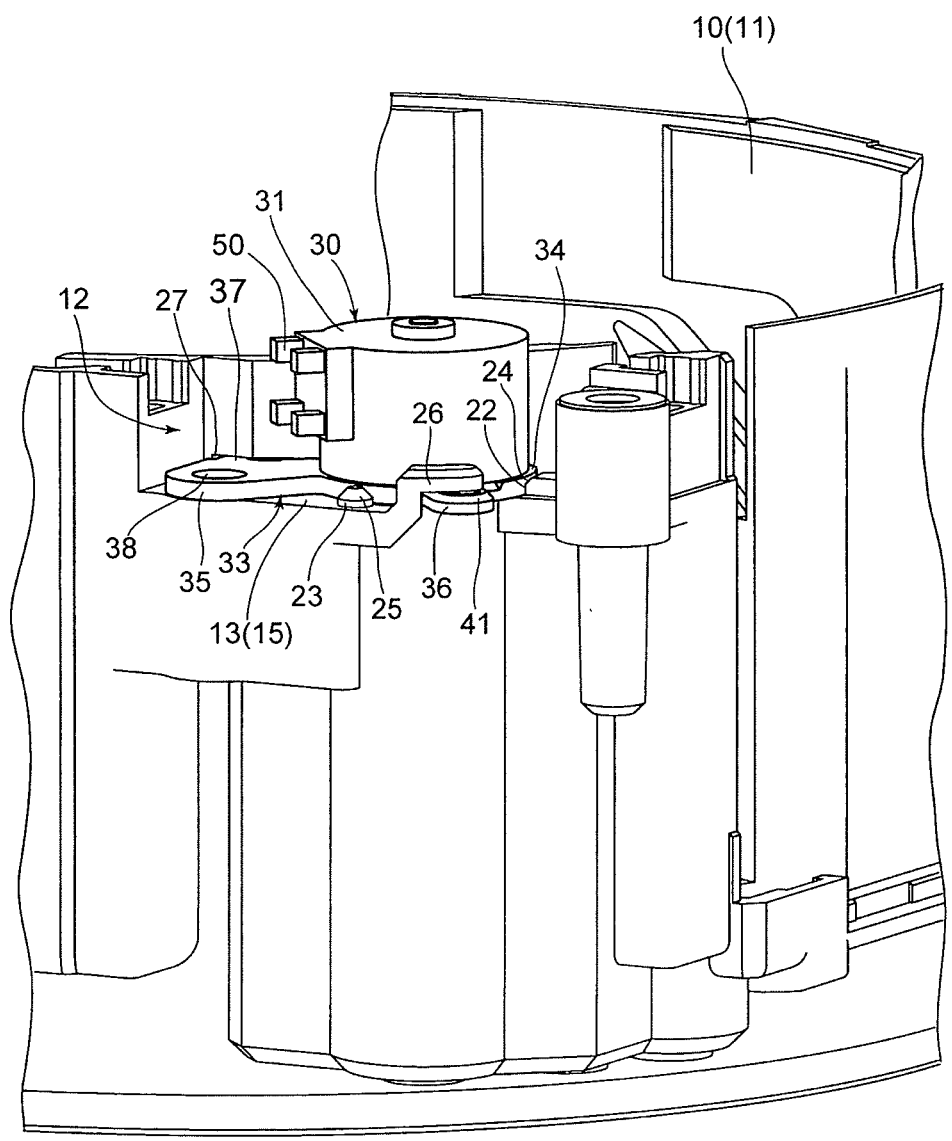
FIG. 12 is a perspective view of a portion of the support member and the motor unit, showing a state where the motor unit is mounted to the motor support portion of the support member, viewed at a different angle from the angle shown in FIG. 10.

Subsequently, the motor unit 30 is turned about the rotation axis P clockwise with respect to FIG. 8 while sliding the motor support seat 33 on the support surface 13. Thereupon, as shown in FIGS. 10 through 12, the second radial projecting portion 36 moves to a position to overlap the movement limiting arm 26 so that the lock projection 28, which is formed on the rear of the movement limiting arm 26, is engaged in the lock depression 39, which is formed on the second radial projecting portion 36. When the lock projection 28 is engaged in the lock depression 39, the lock projection 28 rides over the second radial projecting portion 36 while resiliently deforming the movement limit arm 26 forward. Subsequently, upon the lock depression 39 moving to a position aligned with the lock projection 28 in the direction of the rotation axis P, the movement limiting arm 26 resiliently returns to its normal shape, so that the engagement between the lock projection 28 and the lock depression 39 is maintained.

When the motor unit 30 is in a rotational (turning) position in which the lock depression 39 is engaged with the lock projection 28, the hook 37 is engaged in the movement limit hole 27. Since the chamfers 41 and 40 are formed on the second radial projecting portion 36 and the hook 37, respectively, the second radial projecting portion 36 is prevented from getting caught on the movement limiting arm 26 or the lock projection 28 and the hook 37 is prevented from getting caught on a portion of the motor support portion 12 around the movement limit hole 27, which enables smooth turning of the motor unit 30 with respect to the motor support portion 12 possible.

Subsequently, the motor unit 30 can be prevented from rotating with respect to the motor support portion 12 and moving in the forward/rearward direction (direction along the rotation axis P) with respect to the motor support portion 12 by engaging the lock projection 28 into the lock depression 39 and engaging the hook 37 into the movement limiting hole 27. Since the motor unit 30 is prevented from moving radially by engagement of the radial position limiting surfaces 20, 21 and 22 and the radial position limiting projection 23 with the central support portion 34, the motor unit 30 is prevented from moving in all directions with respect to the motor support portion 12 in the state shown in FIGS. 10 through 12. Namely, in the state shown in FIGS. 10 through 12, the motor unit 30 is held immovably by the motor support portion 12. The installation of the motor unit 30 can be completed by being this holding state, or the motor unit 30 can be additionally screw-engaged with the motor support portion 12 to enhance the fixing strength between the motor unit 30 and the motor support portion 12. As shown in FIGS. 10 and 11, the screw insertion hole 38 is positioned to be aligned with the screw hole 17, so that a set screw can be screwed into the screw hole 17 through the screw insertion hole 38. The motor unit 30 is already held at a fixed position by contact and engagement between the motor support seat 33 and the motor support portion 12, and accordingly, there is no possibility of the motor unit 30 being displaced from the designed position when a set screw is screwed into the screw hole 17, unlike the case where the motor unit 30 is only fixed to the motor support portion 12 by set screws.

The motor unit 30 is prevented from moving in the forward/rearward direction by an insertion of the hook 37 into the movement limiting hole 27; however, in addition, the motor unit 30 is prevented from moving forward by the engagement between the second radial projecting portion 36 and the movement limiting arm 26 and is prevented from moving rearward by the engagement between the support surface 13 and the motor support seat 33, and therefore, the motor unit 30 can be retained at a fixed position even if the movement limiting hole 27 and the hook 37 are omitted. However, from the viewpoint of strength, it is desirable that the motor unit 30 be prevented from moving especially in a direction away from the support surface 13 (i.e., in the forward direction) by a combination of the engagement between the movement limiting arm 26 and the second radial projecting portion 36 and the engagement between the movement limiting hole 27 and the hook 37, rather than solely by the engagement between the movement limiting arm 26 and the second radial projecting portion 36. The present embodiment of the motor support structure has, in particular, superior stability because an axial movement limiting portion configured of the movement limiting arm 26 and the second radial projecting portion 36 is positioned in a circumferential direction about the rotation axis P between the radial limiting surface 22 and the radial limiting projection 23 while an axial movement limiting portion configured of the engagement between the movement limiting hole 27 and the hook 37 is positioned in a circumferential direction about the rotation axis P between the radial limiting surface 20 and the radial limiting projection 23, i.e., because the motor unit 30 is prevented from moving in the axial direction (i.e., in the direction of the rotation axis P) at positions on substantially (diametrically) opposite sides of the rotation axis P.

As described above, according to the motor support structure of the present invention, the position of the motor unit 30 in radial directions is fixed by inserting the motor unit 30 into the motor support portion 12 in a direction along the rotation axis P until the motor unit 30 comes into contact with the support surface 13 of the motor support portion 12, and subsequently, the position of the motor unit 30 in both the axial direction and the rotational direction is fixed by turning the motor unit 30 about the rotation axis P with respect to the motor support portion 12, which completes the installation of the motor unit 30. Apart from the rough positioning of the motor unit 30 relative to the motor support portion 12 being required when the drive shaft 32 is inserted into the drive shaft insertion hole 16, the motor unit 30 is fixed to the motor support portion 12 by an easy installation operation by inserting the motor unit 30 into the motor support portion 12 until the motor unit 30 is prevented from being further inserted by the support surface 13 and subsequently turning the motor unit 30 until the motor unit 30 is prevented from being further turned by the engagement between the lock projection 28 and the lock depression 39. Accordingly, there is no need to be aware of the precise positioning of the motor unit 30 relative to the motor support portion 12, so that the motor unit 30 can be securely installed with superior workability compared with conventional motor support structures.

The present invention is not limited solely to the particular embodiment described above, and various modifications can be made without departing from the spirit and scope of the invention. For instance, the above illustrated embodiment of the motor support structure is provided with a total of four contact portions: the three radial limiting surfaces 20, 21 and 22 and the one radial limiting projection 23, which constitute peripheral border contact portions on the support member 10 which come in contact with the central support portion 34 of the motor unit 30 to limit movement of the motor unit 30 in radial directions. However, to limit movement of the central support portion 34 in radial directions, only at least three contact portions need to be provided on the motor support portion 12 side in order to embody the present invention. Alternatively, it is also possible for five or more contact portions that come in contact with the central support portion 34 to limit movement thereof in radial directions to be provided on the motor support portion 12 side.

Additionally, the above illustrated embodiment of the motor support structure is provided with a combination of the movement limiting arm 26 and the second radial projecting portion 36 and a combination of the movement limiting hole 27 and the hook 37, which constitute axial-position limiters that limit the axial movement of the motor unit 30 in a direction away from the support surface 13; however, the number of the axial-position limiters is not limited solely to this particular number. For instance, it is possible to provide three or more of the axial-position limiters at three or more different positions.

Additionally, the above illustrated embodiment of the motor support structure is provided with the lock projection 28 and the lock depression 39 that are formed on the movement limiting arm 26 and the second radial projecting portion 36, respectively, and constitute rotation limiters that limit turning of the motor unit 30 when the motor unit 30 is turned to a predetermined position. Accordingly, the above illustrated embodiment of the motor support structure is structured such that the rotation limiters (the lock projection 28 and the lock depression 39) are provided on the axial-position limiters (the movement limiting arm 26 and the second radial projecting portion 36); however, it is possible to provide the rotation limiters independently at positions different from the positions of the axial-position limiters.

Obvious changes may be made in the specific embodiment of the present invention described herein, such modifications being within the spirit and scope of the invention claimed. It is indicated that all matter contained herein is illustrative and does not limit the scope of the present invention.

What is claimed is:

1. A motor support structure provided in a lens barrel, said motor support structure comprising:
    a support member that supports a motor having a rotary shaft;
    a radial position limiter which limits a radial position of said motor with respect to said support member in radial directions orthogonal to said rotary shaft;
    an axial-position limiter which limits an axial position of said motor with respect to said support member in an axial direction of said rotary shaft when said motor is turned to a predetermined position about said rotary shaft with said radial position of said motor limited by said radial position limiter; and
    a rotation limiter which limits the turning of said motor about said rotary shaft at said predetermined position, wherein said axial position of said motor is limited by said axial-position limiter at said predetermined position.

2. The motor support structure according to claim 1, wherein said support member comprises a motor support surface which is orthogonal to said rotary shaft of said motor, and
    wherein said radial position limiter comprises:
        a support seat which is provided on said motor and supported by said motor support surface thereon; and
        a plurality of peripheral border contact portions which are formed on said motor support surface and surround said support seat to limit movement of said support seat in said radial directions when said support seat of said motor is mounted onto said motor support surface to be supported thereby.

3. The motor support structure according to claim 2, wherein said support seat of said motor comprises a rotational guide support portion, at least part of an outer edge of said rotational guide support portion having a circular shape about said rotary shaft, and
    wherein at least one of said plurality of peripheral border contact portions is formed as a part of a cylindrical surface that is centered about said rotary shaft and comes in contact with said rotational guide support portion.

4. The motor support structure according to claim 3, wherein said axial-position limiter comprises:
    a radial projecting portion which projects radially from said rotational guide support portion of said motor; and
    an axially opposed portion which is formed on said support member and is positioned to be opposed to said radial projecting portion in said axial direction of said rotary shaft when said motor is turned to said predetermined position about said rotary shaft.

5. The motor support structure according to claim 4, wherein said rotation limiter comprises a projection and a depression which are provided on one and the other of said radial projecting portion and said axially opposed portion, respectively, to be engaged with each other in an axially aligned state when said motor is turned to said predetermined position about said rotary shaft.

6. The motor support structure according to claim 4, wherein a plurality of said radial projecting portions are arranged at different circumferential positions about said rotary shaft, and
    wherein a plurality of said axially opposed portions are arranged at different circumferential positions about said rotary shaft.

7. The motor support structure according to claim 1, wherein said motor comprises:
    a motor body, said rotary shaft projecting from said motor body; and
    a motor support seat fixed to said support member, wherein said motor body is fixed onto said motor support seat.

\* \* \* \* \*